(12) United States Patent
Kirkby et al.

(10) Patent No.: US 9,524,522 B2
(45) Date of Patent: Dec. 20, 2016

(54) HYBRID RECOMMENDATION SYSTEM

(71) Applicant: Accenture Global Services Limited, Dublin 4 (IE)

(72) Inventors: Stephen Denis Kirkby, Unley Park (AU); Theam Yong Chew, Adelaide (AU); Christos Boukis, Attiki (GR); Georgios Passalis, Athens (GR)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 13/790,854

(22) Filed: Mar. 8, 2013

(65) Prior Publication Data

US 2014/0067597 A1    Mar. 6, 2014

(30) Foreign Application Priority Data

Aug. 31, 2012 (EP) .................................. 12386020

(51) Int. Cl.
  *G06Q 30/00* (2012.01)
  *G06Q 30/06* (2012.01)
(52) U.S. Cl.
  CPC ............................... *G06Q 30/0631* (2013.01)
(58) Field of Classification Search
  None
  See application file for complete search history.

(56) References Cited

U.S. PATENT DOCUMENTS

| | | | |
|---|---|---|---|
| 6,266,649 B1 * | 7/2001 | Linden et al. | 705/7.29 |
| 7,983,952 B1 * | 7/2011 | Dillon | 705/26.7 |
| 8,326,690 B2 * | 12/2012 | Dicker et al. | 705/14.54 |
| 8,359,227 B2 * | 1/2013 | Wan et al. | 705/7.38 |
| 2004/0225509 A1 * | 11/2004 | Andre | 705/1 |
| 2005/0066350 A1 * | 3/2005 | Meuleman | 725/10 |
| 2007/0150369 A1 * | 6/2007 | Zivin | 705/26 |
| 2007/0203790 A1 * | 8/2007 | Torrens et al. | 705/14 |
| 2009/0248494 A1 | 10/2009 | Hueter et al. | |
| 2010/0114692 A1 * | 5/2010 | Steelberg et al. | 705/14.44 |
| 2011/0145051 A1 * | 6/2011 | Paradise et al. | 705/14.25 |
| 2011/0184806 A1 * | 7/2011 | Chen | G06K 9/6226 705/14.52 |
| 2011/0258085 A1 * | 10/2011 | Kane et al. | 705/27.1 |
| 2011/0282821 A1 * | 11/2011 | Levy | G06Q 30/0631 706/47 |
| 2012/0066087 A1 * | 3/2012 | Zhang | 705/26.7 |
| 2012/0095863 A1 * | 4/2012 | Schiff et al. | 705/26.7 |
| 2012/0259729 A1 * | 10/2012 | Linden et al. | 705/26.7 |

(Continued)

OTHER PUBLICATIONS

Anonymous, Display Ad 13—No Title, 1894, Apr. 10, New York Times (1857-1922).*

(Continued)

*Primary Examiner* — Jason Dunham
*Assistant Examiner* — Brittany Bargeon
(74) *Attorney, Agent, or Firm* — Mannava & Kang, P.C.

(57) ABSTRACT

A hybrid recommendation system uses offline testing and online testing to generate and optimize recommendation functions. The functions generate recommendations which may be presented online for product purchases. Indices are created from the recommendations. Lookups may be performed on the indices to select recommendations for a particular user. The selected recommendations may be filtered before presenting to the user.

10 Claims, 9 Drawing Sheets

(56) References Cited

U.S. PATENT DOCUMENTS

2012/0323682 A1* 12/2012 Shanbhag et al. ......... 705/14.51
2012/0330778 A1* 12/2012 Eastham ..................... 705/26.7
2013/0204737 A1*  8/2013 Agarwal et al. ............ 705/26.7
2013/0246216 A1*  9/2013 Chau et al. ................. 705/26.7
2013/0254065 A1*  9/2013 Harbick et al. ............. 705/26.7

OTHER PUBLICATIONS

Srikumar, K. (2004). A framework of agent-based personalized recommender system for E-commerce. South Asian Journal of Management, 11(2), 66-80. Retrieved from http://search.proquest.com/docview/222721002?accountid=14753.*

Srikumar, K. (2004). A framework of agent-based personalized recommender system for E-commerce. South Asian Journal of Management, 11 (2), 66-80. Retrieved from http://search.proquest.com/docview/222721002?accountid=14753.*

Adomavicius G. et al: "Toward the Next Generation of Recommender Systems: A Survey of the State-of-the-Art and Possible Extensions", IEEE Transactions on Knowledge and Data Engineering, IEEE Service Center, Los Alamitos, CA, US, vol. 17, No. 6, Jun. 1, 2005, pp. 734-749.

"European Search Report on EP Application No. 13004285.6", European Patent Office, Feb. 14, 2014, 10 pages.

* cited by examiner

HYBRID RECOMMENDATION SYSTEM

PRIORITY

The present application claims priority under 35 U.S.C 119 (a)-(d) to European Patent application number 12 386 020.7, filed on Aug. 31, 2012, which is incorporated by reference in its entirety.

BACKGROUND

Online shopping and online purchases have increased dramatically over the years. Competition between online retailers has become fierce and these online retailers try to provide the best user experience and also try to implement techniques to increase sales. One such technique is through recommendations. It is not uncommon for an online retailer to provide a recommendation to a user viewing a web page for a particular product. Typically, the recommendation identifies other products that were purchased by other users in combination with the product currently being viewed by the user. However, in many instances, the recommendations are outdated or duplicative or do not further specific goals of the retailer.

BRIEF DESCRIPTION OF DRAWINGS

The embodiments are described in detail in the following description with reference to the following figures. The figures illustrate examples of the embodiments.

DETAILED DESCRIPTION OF EMBODIMENTS

For simplicity and illustrative purposes, the embodiments of the invention are described by referring mainly to examples thereof. Also, numerous specific details are set forth in order to provide a thorough understanding of the embodiments. It will be apparent however, to one of ordinary skill in the art, that the embodiments may be practiced without limitation to one or more of these specific details. In some instances, well known methods and structures have not been described in detail so as not to unnecessarily obscure the description of the embodiments.

According to an embodiment, a hybrid recommendation system determines recommendations for product purchases based on offline and online testing. The offline testing analyzes and adjusts a plurality of recommendation functions and the online testing may be used to validate or further adjust the recommendation functions that maximize one or more performance metrics. These recommendation functions may be used to create recommendation indices representing recommendations for different products and users. The indices are then used to determine candidate recommendations in a real-time environment to provide to users viewing product web pages. A scoring function may be applied to select candidate recommendations to display to the user.

Figure 1:
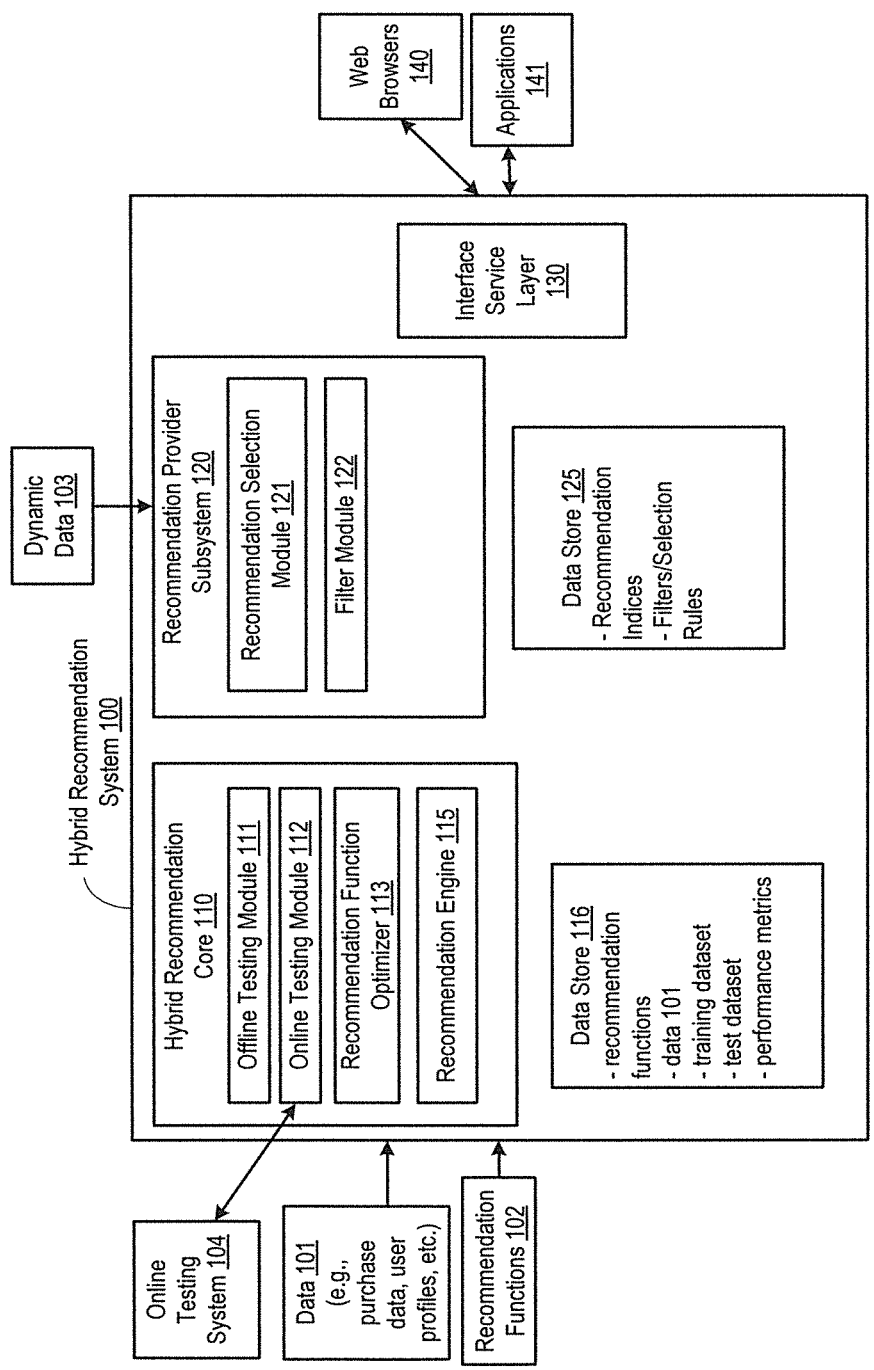
FIG. 1 illustrates a hybrid recommendation system.

FIG. 1 discloses a hybrid recommendation system 100, according to an embodiment. The system 100 includes a hybrid recommendation core 110 and a recommendation provider subsystem 120. The hybrid recommendation core 110 generates recommendation indices of recommendations and the recommendation provider subsystem 120 determines recommendations from the indices to provide to a user.

The hybrid recommendation core 110 includes an offline testing module 111, online testing module 112, recommendation function optimizer 113 and a recommendation engine 115. Recommendation functions 102 may be input by a user or another system to the system 100. A recommendation function is a function for determining a recommendation based on one or more parameters. The recommendation functions 102 may include at least one of statistical models, commentary, adjustable parameters, test plan, enhancement steps, applicable recommendation scenarios, variations needed for different scenarios, etc. Different functions may be tested and their parameters periodically adjusted to optimize the recommendation functions. The recommendation functions 102 may identify purchase patterns, identify peers or pairs of products purchased together, analyze bundles, consider merging baskets from different purchases and time periods, etc. A basket may be an online shopping cart where user selections for products to purchase are placed prior to conducting the transaction to purchase the products.

The offline testing module 111 simulates results of providing a recommendation on a test dataset to measure effectiveness of a recommendation function based on one or more performance metrics. In one example, the performance metrics include recall (e.g., the ratio of the items in a basket of a consumer that are matching our recommendations) and precision (e.g., the percentage of the recommendations that turned out to be successful (e.g., resulted in purchases of the recommended products)) but other performance metrics may be used. An item or product item for example is a product for purchase. A product may be a good or service. In one embodiment, data from data 101 includes historic purchase data and user profiles. The historic purchase data includes any data related to online sales, offline sales, transactions, dates, browsing history, etc. A training dataset and a test dataset may be generated from the data 101. The training dataset may be used to create recommendation functions. For example, machine learning techniques may be used to generate classifiers that identify purchase patterns and determine relationships between users and their purchase patterns. These relationships may be used to generate the recommendation functions 102 from the training set. Bayesian networks, neural networks, singular value decomposition (SVD), classifiers may be applied to the training set to determine recommendation functions. Hill climbing or other mathematical optimization techniques may be used to optimize the recommendation functions 102.

The test dataset is used to test the performance of recommendations generated by the recommendation functions 102. For example, the test dataset is evaluated to determine the number of conversions of the recommended products or to determine other performance metrics. The recommendation functions 102 may include adjustable parameters that are adjusted to try to improve the functions 102 and they can be retested in an iterative process.

The online testing module 112 evaluates performance of the recommendation functions 102 that are tested by an online testing system 104. The online testing system 104 may try different recommendation functions or different variations of a recommendation function on different users and captures the online behavior, including transactions. For example, the online testing system 104, to assess the performance of the recommendation engine 115, performs online tests by comparing the performance of a group of customers to whom recommendations have been provided to that of a control group to whom no recommendations are given. The effect of the recommendations can be evaluated by the offline testing module 111 at a macro level, by comparing performance metrics like the average basket size per customer, the average sales per basket, and the average sales per customer. These metrics may also be analyzed at a finer level, for example at the product category level, or customer segment level. Alternatively the effectiveness of recommendations can be assessed at a micro level by matching the items recommended to a customer with the items finally placed in their shopping cart, or by the click-through rates for those items. Other examples of performance metrics and key performance indicators to evaluate recommendations include: baseline analysis metrics, such as number of occurrences or whether number of visits exceed a threshold; funnel analysis metrics for each recommended item, such as number of clicks, number of items added to a cart, number of purchases; basket metrics, such as percentage of baskets that contain a recommended item, percentage of sales that are driven by a recommendation; customer analysis metrics, such as repeat visits, customer life time value; and system performance metrics at run-time.

The recommendation function optimizer 113 may suggest adjustments to adjustable parameters in the recommendation functions based on the performance metrics and may allow a user to make adjustments. Then, the functions can be re-tested. A data store 116 may store the recommendation functions 102, different data sets, performance metrics and any other information used by the core 110 to generate recommendation indices. The data store 116 and the data store 125 may be databases or other types of storage systems.

The recommendation engine 115 generates recommendation indices based on the optimized recommendation functions. The recommendation indices identify by SKU or other product identifiers, one or more products to be recommended for each product offered for sale online or offline. These indices are stored for example in data store 125 and are used by the recommendation provider subsystem 120 to provide recommendations in real-time for users. The data store 125 to store the recommendation indices may be a low-latency data store that provides the recommendations to users without incurring an unsatisfactory delay. The data store may include additional filters or rules that are applied to make final recommendation selections. Recommendation selection module 121 selects products to recommend, for example, by performing index lookups. Dynamic data 103 may identify a product a user is currently viewing and other user information so the lookups can be performed. Filter module 122 applies filters, such as determining whether a product is out of stock or complies with the retailers goals, to determine final product recommendations. The processing speed for determining and providing recommendations is improved by use of lookups on the recommendation indices, minimal amount of computation (filters) to post-process recommendations, fast append, filter, and sort lists of recommendations.

Interface service layer 130 may expose the providing of recommendations as a web service to web browsers 140 or applications 141. The web service may include a method or protocol for communication between two devices over the Internet. For example, the interface service layer 130 may provide web services compatible with PHP (Hypertext Preprocessor, which is an open source general-purpose scripting language that is suited for web development), JAVA, .NET, etc. Thus, the recommendations may be sent to users via a network.

Figure 2:
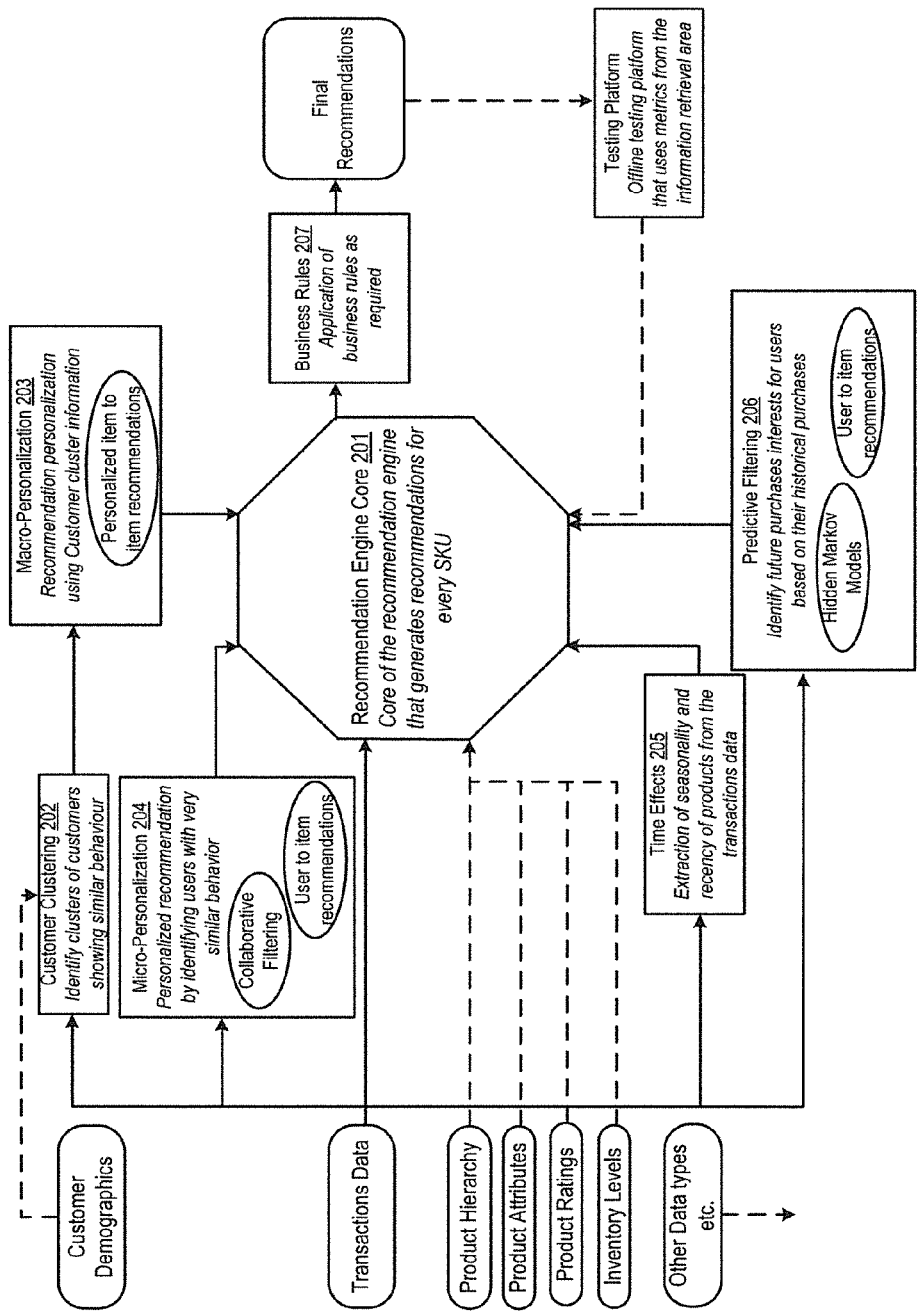
FIG. 2 illustrates a recommendation engine.

FIG. 2 shows a more detailed block diagram for the recommendation engine 115. The recommendation engine 115 may include a core 201, customer clustering component 202, macro-personalization component 203, micro-personalization component 204, time effects component 205, predictive filtering component 206 and business rules component 207. The core 201 generate the recommendation indices that identify products to recommend for example based on recommendation functions implemented by one or more of the components of the recommendation engine 115. Item-to-item, customer-to-item, and other associations determined by the purchase behaviors of items, purchase behaviors of customer segments and purchase behaviors of a specific user. Lookups may be performed on the indices to identify one or more items to recommend.

Examples of information provided by data sources are shown on the left side of FIG. 2. The recommendation engine 115 determines targeted product or service recommendations for users, for example, by processing several sources of data using the components shown in FIG. 2. The data sources may provide information regarding transactions, customer preferences, product taxonomy, product attributes, demographics, etc.

For example, the data sources may provide information related to customer demographics, such as age, gender, location, etc. Customer demographics, along with other data like user preferences, may be used in identifying the similarity between customers for collaborative filtering. Customer demographics can be used also to post filter a recommendation by applying for instance gender, age and marital status information.

Transaction data may include transaction files that include among others the time, the price and the quantity at which an item has been purchased from a specific user. The transaction data may identify customer baskets and items that belong to the same basket are traced. This type of information may be used to determine hidden associations among products by analyzing baskets to generate recommendations of the type "Customers who bought this also bought that". From transaction files the purchase history of every user may be identified and used as input to collaborative filtering techniques that address the question "customers like you also bought this". The transaction data may be used to estimate the significance of key performance indicators that relate to customer value and customer preferences. For instance, from transaction files, a time of day is identified when a user visits a store and which days of the week or month he/she performs his/her purchases. The value of customers to the retailer and the customer's preferred payment method (if this is recorded properly) may also be determined. Also preferred categories shopped by every user and also their product or service usage and product-related preferences may be determined. Also, from point of sale data, sales, customers' counts, and purchase times can be determined.

The data sources may provide information related to product hierarchy which may include various levels of the product hierarchy. For example, for retailers with a large product range that may have a "long tailed" purchasing pattern or where the user to item association index is sparse, product taxonomy can be used to apply association analysis at various levels of the product hierarchy and thus enrich the recommended items list. This method can be also used to tackle the "cold start" problem where recommendations are needed for items that have not been sold yet.

The data sources may provide information related to product attributes to identify similarities among products within a specific product category. This type of information can contribute toward assessing the similarity of products within the same category. Product attributes along with product ratings (if available) or sales can be used to perform attribute weight analysis and estimate the importance of every attribute to the revenue of the retailer. Product descriptions may be used when product attributes are unavailable to identify the similarity of products for example by applying text similarity functions.

Product ratings, when available, can be processed to generate useful recommendations as well. Products that are estimated to be rated high from a user can be recommended for another user in a similar demographic. Store characteristics may be used to account for the location where a purchase is placed in the generated recommendations and for the store size and other store characteristics.

The data from the data sources can also be used to generate customer analytic records (CARs) that provide information related to the behavior and the characteristics of a customer. A CAR may include customer related KPIs like the number of purchases by a customer, his/her average basket size, the time (the days of week, time of day) and locations at which his/her purchases were made, the average number of trips to the store, the product categories purchased, the preferred payment method and so on. CARs can be used to perform micro- or macro-segmentation and to assist the performance of personalization of recommendations.

The customer clustering component 202 identifies clusters of users that have similar purchase-related behavior and have similar demographics. The macro-personalization component 203 may use the clusters to determine that a user of a cluster may be recommended an item based on an item purchased by someone else in the same cluster.

The micro-personalization component 204 generates recommendations based on information personal to the user.

The time effects component 205 generates recommendations based on seasonality and recentness of transaction data. For example, transaction data that is more recent is weighted heavier and transaction data relevant to a seasonal purchase may be weighted heavier.

The predictive filtering component 206 identifies future purchase interests for users based on their historical purchases. The predictive filtering component 206 may use Hidden Markov models to make user-to-item recommendations.

The business rules component 207 may be applied to a set of recommendations generated by the recommendation core 201 to select final recommendations to be presented to the user. For example, a business rule may indicate that whenever displaying books, only recommend books. In another example, instead of providing normal recommendations, give top 5 promotion items.

The final recommendations may be provided to the testing platform which may include the offline testing module 111 and/or the online testing module 112 working with the online testing system 104 shown in FIG. 1 to optimize the recommendation functions.

The components of the recommendation engine 115 shown in FIG. 2 perform association analysis to determine item-to-item associations. For example, the transaction data, since it provides information related to who purchased what, when, and where, is used to identify baskets and recognize item groups that are frequently purchased together. This can be the basis of association analysis. Using this information, item-to-item (whereby an item can be a product or service) recommendations are generated. For example, for every product within a basket, products that are usually purchased together with that one are recommended. Therefore recommendations of the type "customers who bought this also bought that" are generated. Thus a set of recommendations for every product and every basket can be generated. In particular, associations between pairs or even sets of products that are purchased together are determined for the recommendations.

To determine these associations, the recommendation functions may include scoring functions to analyze customer baskets and the significance of each item set in the baskets is estimated. Examples of scoring functions that may be used as recommendation functions include support count, support, confidence, and a cosine metric. Formulas for calculating values for these scoring functions are described below.

Support count of an item set is the number of transactions that contain this particular item set. Mathematically the support count of an item set X is defined as $$\sigma(X) = |\{t_i | X \subseteq t_i, t_i \in T\}|,$$

where the operator |•| denotes the number of elements in a set, $t_i$ is a transaction that consists of several items $i_k$, $T=\{t_1, t_2, \ldots, t_N\}$ is the set of all transactions and $I=\{i_1, i_2, \ldots, i_d\}$ is the set of all available items.

Support, which determines how often an association rule of the form $i_k \rightarrow i_m$ is applicable in a given dataset consisting of N transactions $$s(i_k \rightarrow i_m) = \frac{\sigma(i_k \rightarrow i_m)}{N}$$

Confidence that measures how often item $i_m$ appears in transactions that contain item $i_k$ $$c(i_k \rightarrow i_m) = \frac{\sigma(i_k \rightarrow i_m)}{\sigma(i_k)}$$

Cosine metric, which is defined as $$\text{cosine}(i_k, i_m) = \frac{s(i_k, i_m)}{\sqrt{s(i_k)s(i_m)}}$$

Values for these scoring functions are computed and their performance is evaluated. The values may be compared to predetermined benchmarks to determine whether there is an association between items. The values may be combined and weighted to compare to benchmarks. Other metrics may also be used, such as Mutual Information and Pearson Correlation.

Other factors may be used in the scoring functions. For example, recentness of transaction data may be considered, price of items and geography may be considered. For example, a scoring function may include the following:

$$\text{scoring}(i_k \to i_m) = w_{price} \sqrt{w_{geo} \times \text{UniqueUser}(i_k, i_m) \times \sum_{m=0}^{M} \left(\frac{t_m - t_0}{t_1 - t_0}\right)^n}$$

with $w_{price}$ and $w_{geo}$ being nonlinear weighting factors that take into account the relative price of items $i_k$ and $i_m$ and also the relative distance between the place where the purchase of the pair takes place and the location where the recommendations are going to be provided. Also, in this scoring function, t is the time parameter designating the time a transaction was performed. $t_0$ is the time of the first transaction in the dataset of transaction; $t_1$ is the time of the most recent transaction; and $t_m$ is the time the m-th transaction was done. M is the total number of transactions in the dataset. n is an exponential that determines the effect of a timeliness of a transaction. This is an adjustable parameter that may be adjusted in an iterative process by a user or by predetermined amounts to improve the outcome of the scoring function. Typical values may be 2, 3, 4, . . . . The larger the value of n, the less important historical transactions become. The function UniqueUser($i_k$,$i_m$) is the number of distinct users that have purchased the items and is a metric measuring popularity of the items.

Collaborative filtering may be performed by one or more of the components shown in FIG. 2 to determine customer-to-item associations. Full transaction histories of every customer can be extracted from transaction data. This can then be used for the application of collaborative filtering techniques. These techniques attempt to find for every customer, customers with similar purchasing behavior, characteristics and purchasing patterns, and preferences. Then recommendations for a customer are generated by identifying the most frequent purchases of similar customers. The recommendations generated with this approach are of the form "customers like you also bought this".

The similarity among customers can be defined in several fashions. One approach is to compare the record of every customer to the records of the other customers based on their CARs and to generate a similarity index. This index may be frequently updated as customers are dynamic entities that continuously purchase new items and thus continuously alter their preferences and behavior as this is recorded in the CARs. Another approach is to apply micro-clustering techniques to group customers into segments of users with like behavior and to generate recommendations for a customer using the purchases of his peers within the same group. This approach is less computation intense but may be less accurate than the former one.

Figure 3:
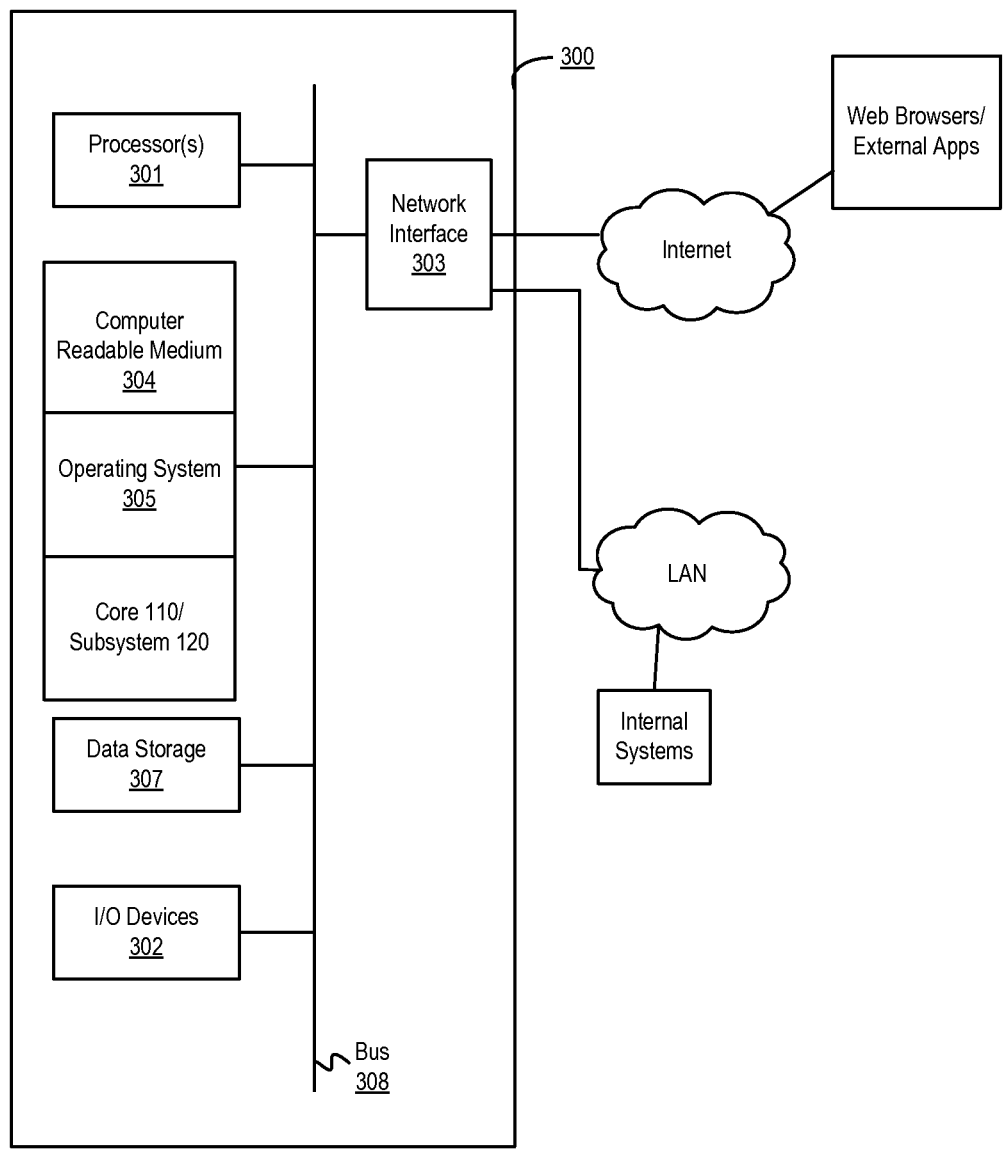
FIG. 3 illustrates a computer system that may be used for the methods and systems described herein.

FIG. 3 illustrates a computer system 300 that may be used to implement the system 100. The computer system 300 may include additional components not shown and that some of the components described may be removed and/or modified. The computer system 300 may be a server or the system 100 may be implemented in a distributed computing system on a plurality of servers. Each server may include the components of the computer system 300.

The computer system 300 includes processor(s) 301, such as a central processing unit, ASIC or other type of processing circuit, input/output devices 302, such as a display, mouse keyboard, etc., a network interface 303, such as a Local Area Network (LAN), a wireless 802.11x LAN, a 3G or 4G mobile WAN or a WiMax WAN, and a computer-readable medium 304. Each of these components may be operatively coupled to a bus 308. The computer readable medium 304 may be any suitable medium which participates in providing instructions to the processor(s) 301 for execution. For example, the computer readable medium 304 may be non-transitory or non-volatile medium, such as a magnetic disk or solid-state non-volatile memory or volatile medium such as RAM. The instructions stored on the computer readable medium 304 may include machine readable instructions executed by the processor(s) 301 to perform the methods and functions of the system 100.

The system 100 may be implemented as software stored on a non-transitory computer readable medium and executed by one or more processors. For example, the computer readable medium 304 may store an operating system 305, such as MAC OS, MS WINDOWS, UNIX, or LINUX, and code for the core 110/subsystem 120. The operating system 305 may be multi-user, multiprocessing, multitasking, multithreading, real-time and the like. For example, during runtime, the operating system 305 is running and the code for the core 110/subsystem 120 is executed by the processor(s) 301.

The computer system 300 may include a data storage 307, which may include non-volatile data storage. The data storage 307 stores any data used by the system 100. The data storage 307 may be used for one or more of the data stores 116 or 125 shown in FIG. 1 or the data stores 116 or 125 may be hosted by separate database servers.

The network interface 303 connects the computer system 300 to internal systems for example, via a LAN. Also, the network interface 303 may connect the computer system 300 to the Internet. For example, the computer system 300 may connect to web browsers and other external applications and systems, including the online testing system 104, via the network interface 303 and the Internet.

The recommendation functions of the hybrid recommendation system 100 process a diverse range of data sources as described above and creating several types of outputs in the process. An important class of outputs is the different recommendation indices produced by the recommendation engine 115 and the test recommendation indices created at intermediate stages used for offline testing. The creation of indices trades off storage space for faster computational time, whether for serving recommendations or for offline testing. Hence, the hybrid recommendation system 100 may impose certain resource requirements on the data store and processors. In one example, the hybrid recommendation system 100 may be implemented in a distributed computing environment, such as a cluster of machines (e.g., servers) as well as network bandwidth on the connections linking the machines together.

In one example, the operations performed by the hybrid recommendation system 100 may be implemented in a map-reduce programming style for running parallel programs. Mapper and reducer programs are written as side-effect free functions that can be executed separately and in parallel on separate fragments of data. They are isolated threads of computation that provide computational speedups. In order to achieve this parallelism, the operations performed by the hybrid recommendation system 100 are framed as sequences of map and reduce tasks that can be executed in parallel.

The operations on the indices performed by the recommendation engine 115 may be effectively reduced to a variation of self-join operations. For example, individual transactional orders are separately processed in association-pair mapper tasks that output primary items as keys, and secondary/recommended items and their weights as values. The map-reduce framework shuffles and re-arranges the outputs by their keys (primary items) for feeding into reducer tasks. The reducers then calculate and sort the final pairwise associations in the form of an item-item association or similarity index.

Each mapper may be small enough that the total associations computed or the resources required are limited to the total counts of all product pairs in the data split, or sum (basket_size^2). Each row of the item-item similarity index may be sorted to rank the recommendations by a pre-specified metric. This means that the size of a reducer process depends on the product range offered, and the sparseness of the index. Larger product ranges and denser associations may have larger reducer tasks or more reducers.

Figure 4:
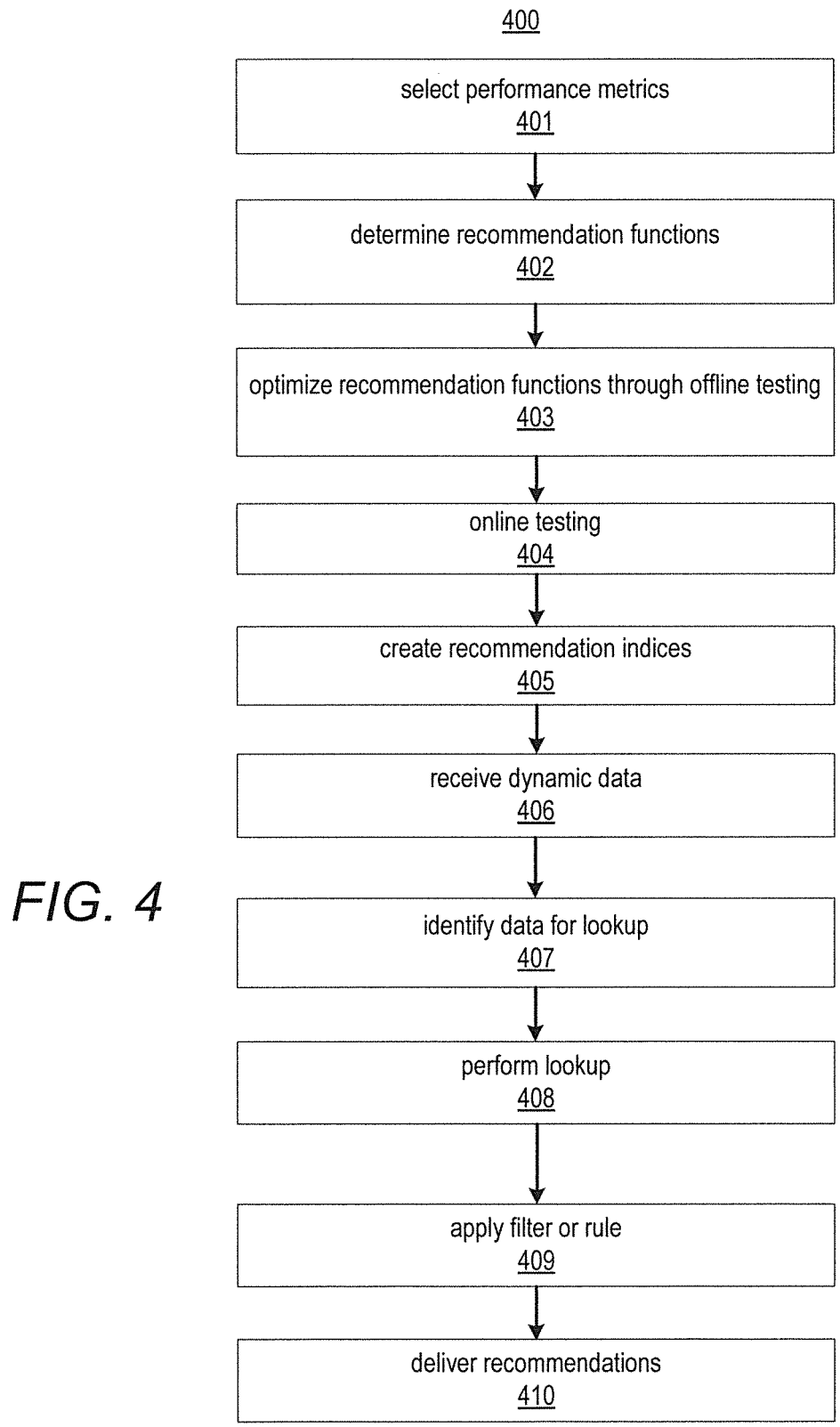
FIG. 4 illustrates a method that may be performed by the hybrid recommendation system.

FIG. 4 illustrates a method 400 according to an embodiment. The method 400 may be performed by the system 100. At 401, performance metrics are selected for evaluating recommendation functions. Examples of the performance metrics may include precision, recall, diversity of product category, diversity of users, time, etc. Other examples of performance metrics are described herein. Different performance metrics may be used for different purchase phases.

At 402, recommendation functions 102 are determined and stored, and at 403 the recommendation functions 102 are optimized through offline testing. Optimizing may be performed to achieve an object, such as to increase the revenues of retailers by providing targeted product or service recommendations. The offline testing may be performed by the offline testing module 111 at 402 and 403. For example, training data sets are generated from historic purchase data and user profiles and are used to identify patterns and relationships between a performance metric and other variables. In one example, the historical transaction data is split into training and testing datasets whereby 80% of the data may be used for training and 20% may be used for testing. As newer data arrives, the datasets (i.e., training and testing) may be redefined at periodic intervals to maintain freshness. Also the datasets may be non-overlapping with respect to time. Additionally, given several datasets with well-defined time separation between the training and test sets, the recentness effect in recommendations may be quantified. The performance of the recommendations over time provides an additional indication of the sales trends of products or services and provides an indication of the suitable frequency for processing the data to provide timely recommendations.

The training dataset may be used to generate recommendations using conventional machine learning techniques, such as Naive Bayes. The recommendations are then evaluated on the test dataset. Offline testing is performed by comparing the set of recommended items to the items in the baskets of the customers in the testing period. The more these two sets are alike the more successful the recommendations are. The effectiveness of recommendations may be assessed using recall (e.g., the ratio of the items in a basket of a consumer that are matching our recommendations) and precision (e.g., the percentage of the recommendations that turned out to be successful). Recall evaluates how many of the items in the customer's basket were triggered by the recommendations and it is estimated as the number of common items in the recommendations set and the basket divided by the number of items in the basket. Therefore if in a basket the items p1, p2, p3, p4 and p5 were used and the recommendation engine 115 recommended the items p2, p4, p6, p8, p9 and p10, then recall is 2/5=40%. Precision is a metric of the effectiveness of the provided recommendations and it is estimated as the number of the common items in the recommendation set and the basket, divided by the number of provided recommendations. Therefore, in the previous example the precision is 2/6=33.33%. Precision may be a monotonically decreasing function regarding the number of provided recommendation, while recall may be a monotonically increasing function of the number of provided recommendation. Therefore, the more recommendation that are provided the higher the recall will be, since there are more chances to trigger a conversion but at the same time the lower the precision becomes.

Precision and recall may be used as performance metrics to optimize the recommendation functions. For example, a recommendation function is applied to a test dataset to determine recommendations and precision and recall are measured. The precision and/or recall may be compared to thresholds to determine if they are satisfactory. If not, adjustable parameters in the recommendation function may be adjusted and the recommendation function is re-tested to improve the performance metrics in an iterative process. For example, when new transactions are placed from customers, the number of items that are purchased together change. This change results in change in the support count (increase or reduction) scoring function which subsequently is reflected in the recommendations. Also, the effect is determined by design parameters which are adjustable. For example, a scoring function is described above that takes into consideration $w_{price}$ and $w_{geo}$ which are nonlinear weighting factors that take into account the relative price of items and location. As indicated above, this scoring function includes an exponential weighting parameter n which an adjustable parameter that may be adjusted in an iterative process to improve the result of the scoring function. Also, the length of the time window used to generate recommendations may be varied, e.g., the length may range from a few months to years, or even all historical transactions.

Additional metrics for the index size, product range coverage, and comprehensiveness may also be used to evaluate recommendations. Cross-recommendation comparisons of overlap or similarity may also be used to aid the adjustment process during optimization.

The offline performance metrics can also be used to measure the effects of business rules on the performance of unconstrained recommendations. This may provide a way to evaluate different what-if scenarios from post-processing recommendations using different business rules or variations of business rules. As an example, suppose a business rule proposing to "limit recommendations for books to only books" is introduced. This eliminates non-book products from those recommendations. This increases the impressions for the recommended books and reduces impressions to non-book products (that are no longer being recommended). The scores for the scoring functions might indicate that the overall conversion rate from the whole book category has been reduced, as estimated from the reduction in the overall recall metric. Conversely, the rule might provide an uplift within certain customer segments (e.g. the "book lovers" segment) especially if the base recommendation functions have not been tuned to recognize such customer segments.

Offline and online testing are not mutually exclusive. The offline testing may be used to initially calibrate the parameters of the recommendation function. Online testing may then be to fine tune them. Offline testing are estimates of the impact that the provided recommendations will have, while online testing is an assessment of the actual impact of recommendations.

At 404, the optimized recommendation function is tested through online testing by the online testing module 112. In one example, multiple recommendation functions are tested through online testing and the top K, where K is an integer greater than 0, recommendation functions are selected based on the performance metrics.

At 405, recommendation indices are created, for example, from the top-performing recommendation functions by the recommendation engine 115. The recommendation indices are stored in the low latency data store 125. The indices identify macro or personalized recommendations. For example, for each product, an index identifies one or more other products to recommend, or for each product and user information for a user that purchased the product, an index identifies one or more other products to recommend. The indices may be supplemented with additional information, such as category of product, purchasing patterns of a product over time including periodicity, summary for product, etc.

After the recommendation indices are created and stored, the indices may be used to provide recommendations to users. For example, at 406, the dynamic data 103 is received which indicates the user's current behavior, such as product currently being viewed, products in a shopping cart, most recent web pages visited, geographic location, current time, recent purchases, demographics, etc. At 407, a product, user information or other information is identified from the dynamic data 103 to perform a lookup on the recommendation indices. At 408, the recommendation selection module 121 performs the lookup on a recommendation index to determine recommendations. At 409, a filter or business rule is applied to select the recommendations, such as only providing recommendations for other books or providing recommendations for long-tail products. For example, a rule may indicate that whenever displaying books, only recommend books (remove anything that is not a book from index). In another example, instead of providing normal recommendations, give top 5 promotion items. At 410, the selected recommendations are delivered to the user. For example, the selected recommendations are displayed on a webpage the user is currently viewing.

The selected recommendations may be recommendations for other products to purchase. The recommendations may include coupons or other promotions. The recommendations may be shown on a web page being currently viewed or may be delivered via email or another communication channel.

Figure 5:
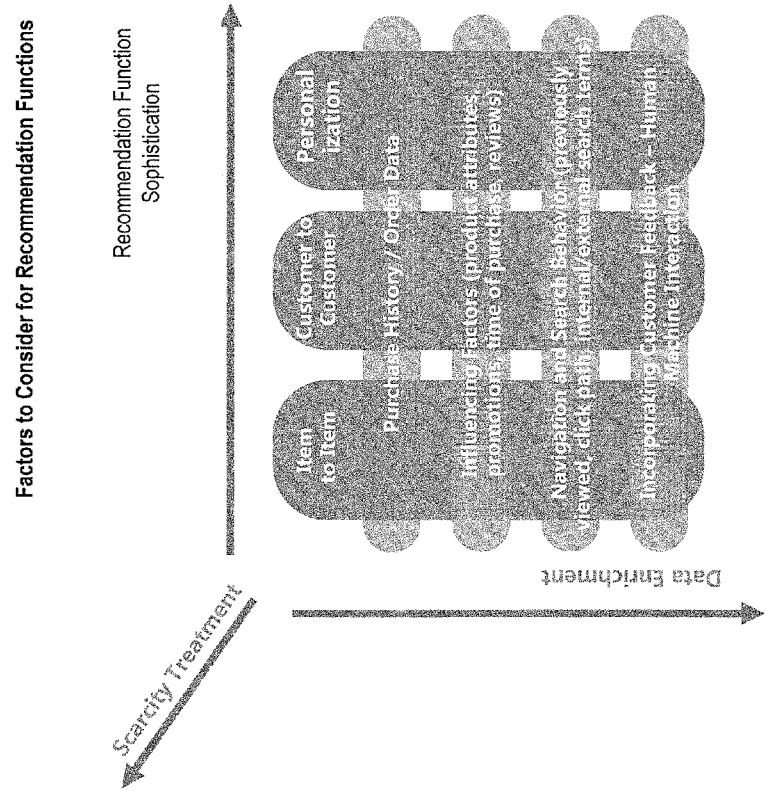
FIG. 5 illustrates examples of factors to consider for determining recommendation functions.
Figure 6:
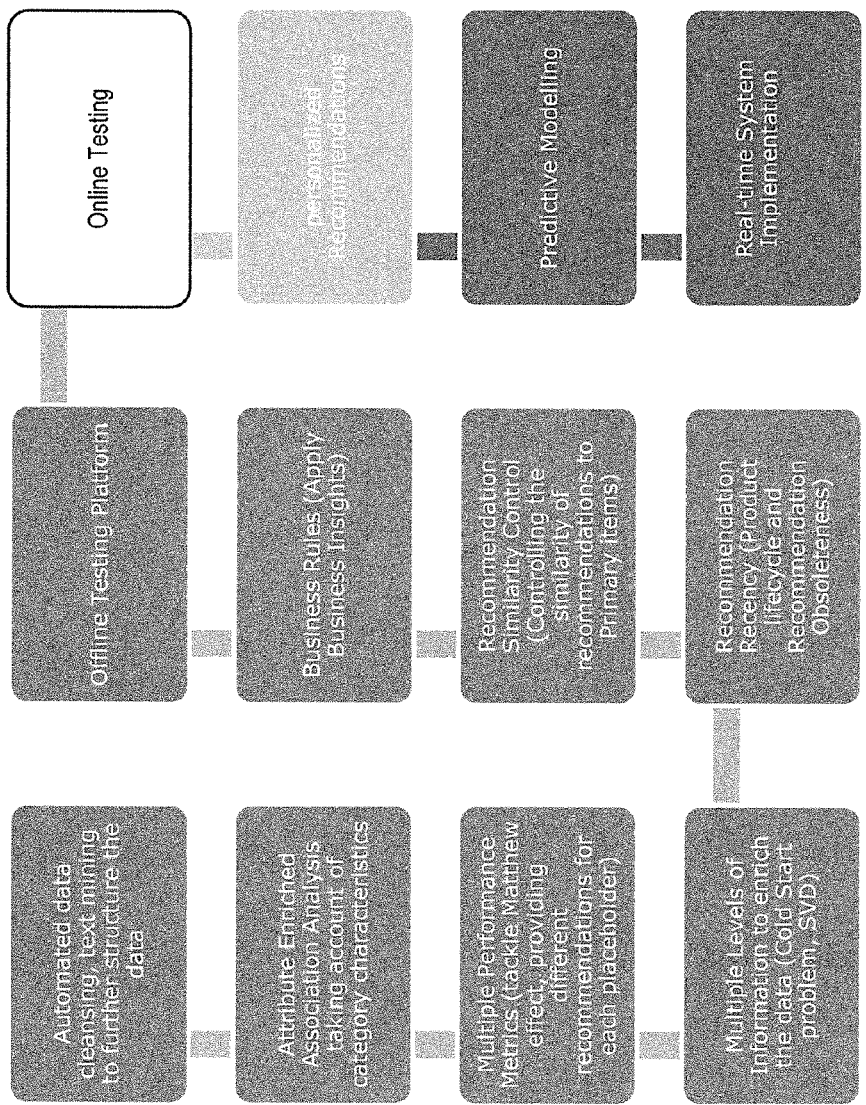
FIG. 6 illustrates examples of detailed steps and factors for determining recommendations.
Figure 7:
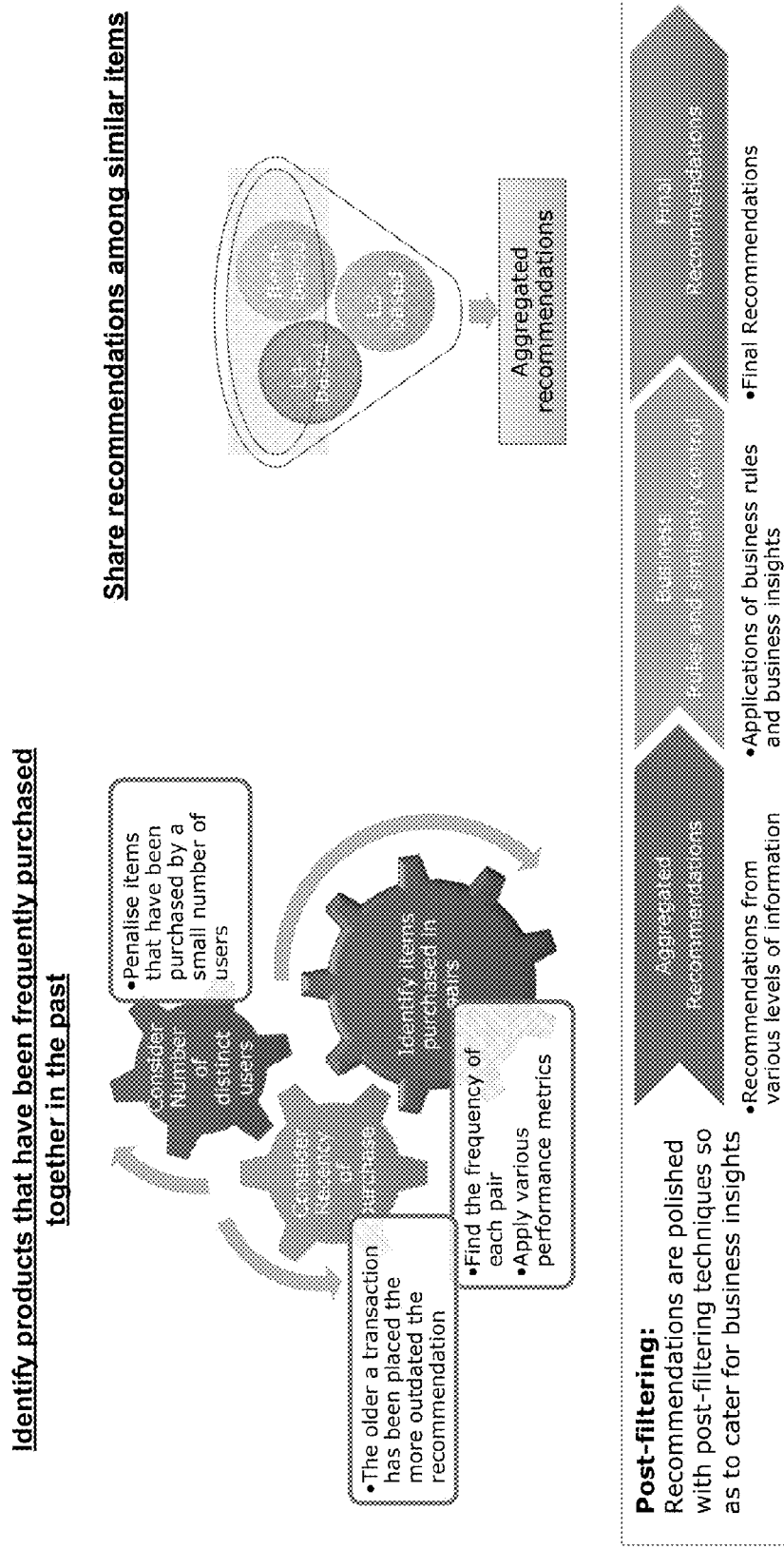
FIG. 7 illustrates an example of a summary of a summary of a process for selecting recommendations.

FIG. 5 illustrates factors to consider for determining recommendation functions. Also, FIG. 5 shows that indices may be created for item-to-item, customer-to-customer or personalized for a specific customer or demographic to determine recommendations. The factors to consider for determining recommendation functions may include purchase history, order data, product attributes, time of purchase, product reviews, navigation and search behavior (e.g., previously viewed web pages, click path, search terms), and customer feedback. FIG. 5 also shows that the recommended function may become more sophisticated as a result of using multiple indices and as data volume is increased. The recommendation function may include a statistical model. Different recommended functions may be tested to find a balance between precision and a model complexity for the recommendation function. A test plan may be associated with a recommendation function to test adjustable parameters. Also, different scenarios may be identified that are best for different recommendation functions. Also, the scarcity treatment refers to the problem when there is not much data. For example, when there is a new product or when there is little purchase history available for a product, product category level relationships may be used for a recommendation function if the indices cannot provide recommendations. FIG. 6 illustrates some detailed steps and factors for determining recommendations. FIG. 7 graphically shows steps for determining recommendations. The recommendation functions identify products that are purchased together. For example, they identify pairs of items purchased together frequently by multiple users and take into consideration the recency of purchased pairs and the number of users that purchased each pair. Multiple performance metrics may be used to assess and optimize the recommendation functions. Also, recommendations may be shared among similar items. For example, a product hierarchy may be determined having multiple levels, such as L0-L4, where L0 is the root. A recommendation determined for one product in a level may be applied to other products in the level or a recommendation may be provided from a level higher up. For example, if L4 does not have sufficient recommendations, then recommendations may be drawn from the L3 level. Also, multiple recommendations may be determined and filtered based on rules or similarity control to determine final recommendations. For example, string similarity algorithms break down each L3 category to several L4 ones; recommendations are shared among the products of an L4 category to tackle the cold start problem; and if L4 does not provide sufficient recommendations, more are drawn from the L3 level.

Figure 8:
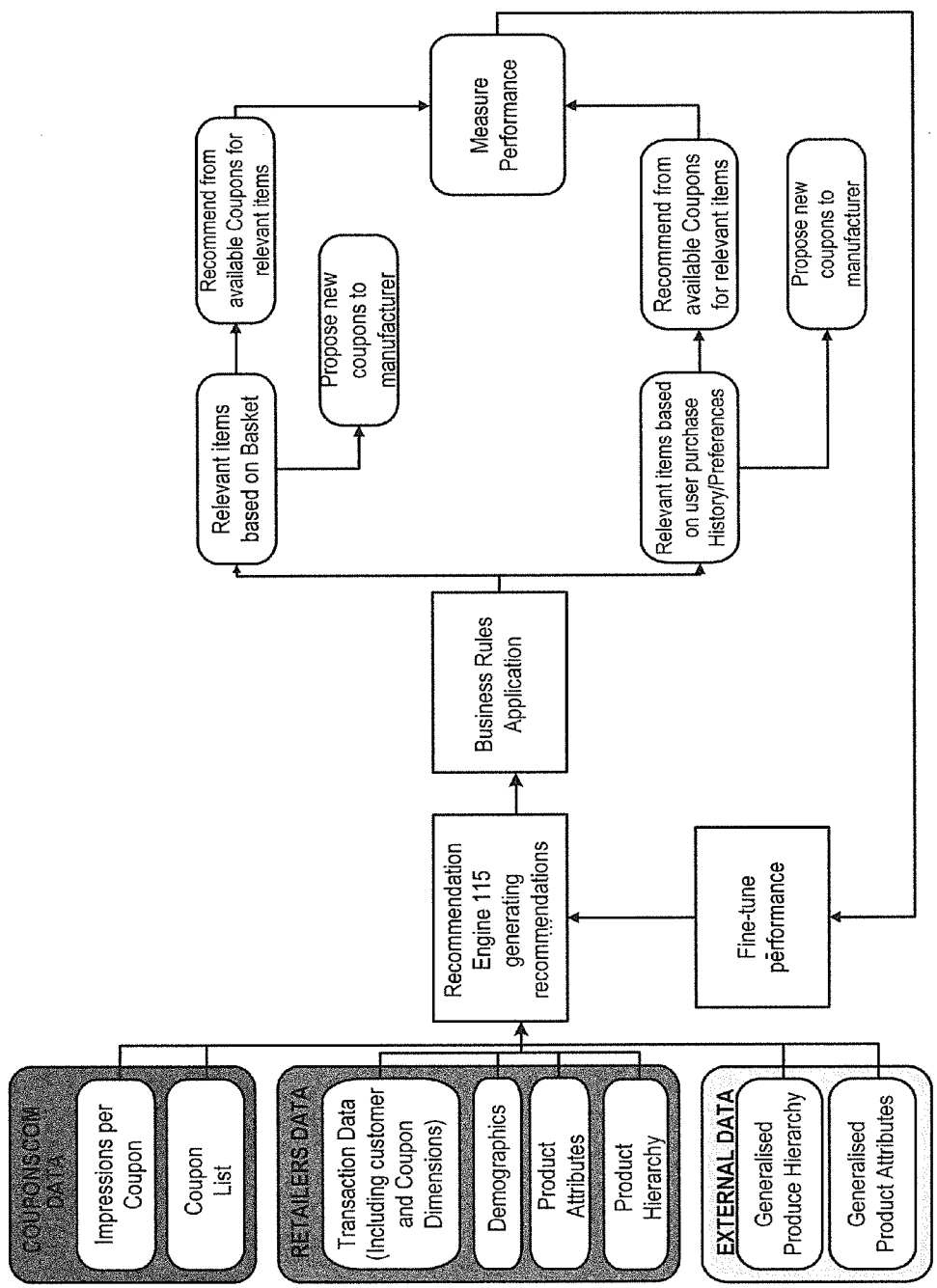
FIG. 8 illustrates an example of a specific use case for coupons.

FIG. 8 shows a specific use case whereby the recommendations are for coupons. The data sources may include, in addition to information shown in FIG. 2, information related to coupons, such as impressions per coupon and a coupon list. The recommendation engine 115 generates recommendations and business rules may be applied to determine the final recommendations. For example, the recommendations are coupons. The coupons may be recommended based on items in a shopping basket. The coupons may be selected from a list of available coupons or new coupons not on the list are recommended. Recommendations may be based on the user, such as based on the user's purchase history and/or preferences. The coupons may be selected from a list of available coupons or new coupons not on the list are recommended. Performance metrics may be used to measure actual performance of the recommendations and perform fin-tuning and optimization of recommendation functions.

Figure 9:
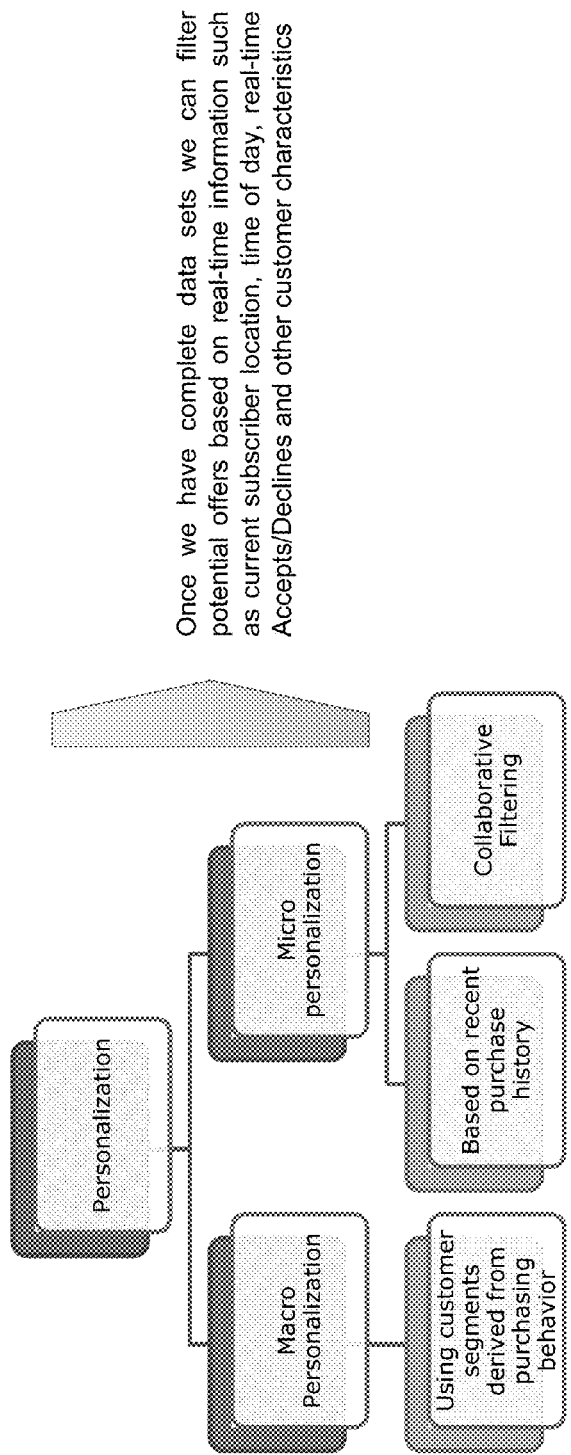
FIG. 9 illustrates an example for providing a real-time recommendations and factors that may be considered to select the recommendation.

FIG. 9 shows an example that illustrates filtering recommendations based on real-time information, such as location, time of day, real-time accepts/declines and other customer/user characteristics. For example, a determination is made that a user has accepted an offer for coffer or a transaction is recorded that a user has just purchased a coffee. The real-time offer targeting can further refine the list of eligible offers by excluding high propensity offers that are not relevant in real-time context. Coupons or other recommendations for coffee may be suppressed for the user for the next hour even though the user is in the vicinity of other coffee shops. In another example, real-time location exclusion may filter out offers that are not available in a subscriber's travel area.

As indicated above, different performance metrics may be considered to select and evaluate recommendation functions and recommendations. The performance metrics may be combined to determine selections. In addition to the examples described above, other examples may include time and diversity. For example, more recent purchases may be given more weight. Diversity determines the number of different users that purchased a pair of products. Also, in order to take into consideration the cold start problem, which may be when there is a new product or when there is little purchase history available for a product, product category level relationships may be determined. For example, if a person buys toothpaste, what other types of products do they buy and how often. Also, benchmarking may be performed for the metrics to determine whether offline or online testing results are satisfactory.

Some examples for calculating the performance metrics are described below. For example, recall and precision may be calculated. For each rank, recall for each product p in basket is:

if count(others)>0,sum(count(intersection(recommendations,others))/count(others)/count(basket)).

Others is the rest of the basket not including p, and recommendations is the recommendation_function(p).

For precision, for each product p in the basket, if count (others)>0 then sum count(intersection(recommendations, others))/count(basket)/count(recommendations).

In another example for calculating recall, let recommendations be an empty set and for each product p in basket:

recommendations=recommendations UNION recommendation_algorithm($p$);

recall=count(intersect(recommendations,basket))/count(basket); and precision=count(intersect(recommendations,basket))/count(recommendations).

In another example, an f-measure (which is 2*precision*recall/(precision+recall)) is used to combine both metrics, and then the time effects are considered.

While the embodiments have been described with reference to examples, those skilled in the art will be able to make various modifications to the described embodiments without departing from the scope of the claimed embodiments.

What is claimed is:

1. A hybrid recommendation system comprising:
a server including a hardware processor, a network interface to connect the hybrid recommendation system to web browsers and other external applications and systems, including an online testing system, via the Internet, and a non-transitory computer readable medium storing machine readable instructions executable by the processor; and
a cluster of data store servers storing recommendation indices, wherein the cluster of data store servers are to perform map and reduce tasks in parallel to perform lookups on the recommendation indices;
wherein the machine readable instructions comprise an offline testing module executed by the processor to perform an offline testing of recommendation functions based on a dataset and performance metrics, and to adjust the recommendation functions;
wherein the machine readable instructions comprise an online testing module executed by the processor to receive, via the network interface, from the online testing system, online behavior of users captured during online testing of the recommendation functions;
wherein the machine readable instructions comprise a recommendation engine executed by the processor to generate the recommendation indices from the recommendation functions determined based at least on the offline testing and store the recommendation indices in the data store servers, wherein the recommendation indices are identifiers of products to recommend;
wherein the machine readable instructions comprise a selection module executed by the processor to receive dynamic data identifying current activity of a user, wherein the dynamic data identifying current activity of a user is sent to the data store servers, and at least one of the data store servers performs a lookup on the recommendation indices with the dynamic data identifying current activity of a user to determine candidate recommendations; and
wherein the machine readable instructions comprise a filter module executed by the processor to receive the candidate recommendations determined from the lookup performed by at the least one of the data store servers and select recommendations from the candidate recommendations based on a filter or rule and present the recommendations to the user, and
the processor delivers the recommendations to a web browser of the user via the network interface,
wherein the performance metrics comprise recall and precision, wherein the recall performance metric is a ratio of a number of items placed in an online shopping cart that match the recommendations over a total number of items placed in the online shopping cart, and wherein the precision performance metric is a percentage of the recommendations that were purchased.

2. The hybrid recommendation system of claim 1, wherein the offline testing module is to generate at least one of the recommendation functions from a training dataset determined from the dataset which is comprised of historic purchase data and to test the recommendation functions from a test dataset determined from the historic purchase data, wherein the training dataset and the test dataset include non-overlapping time periods for transactions for purchases.

3. The hybrid recommendation system of claim 2, wherein the offline testing module is to test the recommendation functions from the test dataset by determining recommendations by the recommendation functions based on information in the test dataset and measuring the performance metrics based on the recommendations.

4. The hybrid recommendation system of claim 1, wherein the recommendation functions include at least one of a support scoring function, a support count scoring function, a confidence scoring function and a cosine metric scoring function.

5. The hybrid recommendation system of claim 1, wherein the recommendation functions include at least one function including parameters for price of items in a shopping cart and distance between a place where a purchase takes place and a location where a recommendation is going to be provided.

6. The hybrid recommendation system of claim 1, wherein the filter module is to apply real-time metrics and a rule to select the candidate recommendations to deliver to the user.

7. The hybrid recommendation system of claim 1, wherein the real-time metrics include current location of the user and recent purchases made by the user.

8. The hybrid recommendation system of claim 1, wherein the recommendations comprise recommendations for products to purchase or a coupon.

9. The hybrid recommendation system of claim 1, wherein the recommendation engine executes the recommendation functions to identify associations between sets of products and associations between users and products based on transaction data for product purchases, user demographics and product information, and the associations are stored in the indices.

10. A hybrid recommendation system to determine recommendations to present to a user for online shopping, the system comprising:
  a server including a hardware processor, a network interface to connect the hybrid recommendation system to web browsers and other external applications and systems, including an online testing system, via the Internet, and a non-transitory computer readable medium storing machine readable instructions executable by the processor; and
  a cluster of data store servers storing recommendation indices, wherein the cluster of data store servers are to perform map and reduce tasks in parallel to perform lookups on the recommendation indices;
  wherein the machine readable instructions comprise an offline testing module executed by the processor to perform an offline testing of recommendation functions based on a dataset and at least one measured performance metric, and to adjust the recommendation functions, wherein to adjust the recommendation functions the offline testing module is to:
    compare the at least one measured performance metric for each of the recommendation functions with at least one predetermined performance metric value, wherein the at least one measured performance metric is based on the offline testing of the recommendation functions on the dataset, and
    for each of the recommendation functions, vary an adjustable parameter of the recommendation function if the at least one measured performance metric of the recommendation function does not meet the at least one predetermined performance metric value;
  wherein the machine readable instructions comprise an online testing module executed by the processor to receive, via the network interface, from the online testing system, online behavior of users captured during online testing of the recommendation functions;
  wherein the machine readable instructions comprise a recommendation engine executed by the processor to generate the recommendation indices from the recommendation functions determined based on the online testing and the offline testing and store the recommendation indices in the data store servers, wherein the recommendation indices are identifiers of items to recommend;
  wherein the machine readable instructions comprise a selection module executed by the processor to receive user data identifying at least one of current activity of a user, purchase history of the user and preferences for the user and the user data is sent to the data store servers, and at least one of the data store servers performs a lookup on the recommendation indices with the user data to determine candidate recommendations based on the user data; and
    wherein the machine readable instructions comprise a filter module executed by the processor to receive the candidate recommendations determined from the lookup performed by at the least one of the data store servers and select recommendations from the candidate recommendations to present to the user based on a filter or rule, and
  the processor delivers the recommendations to a web browser of the user via the network interface,
  wherein the at least one measured performance metric comprises recall and precision, wherein the recall measured performance metric is a ratio of a number of items placed in an online shopping cart that match the recommendations over a total number of items placed in the online shopping cart, and wherein the precision measured performance metric is a percentage of the recommendations that were purchased.

* * * * *

UNITED STATES PATENT AND TRADEMARK OFFICE
CERTIFICATE OF CORRECTION

PATENT NO. : 9,524,522 B2  
APPLICATION NO. : 13/790854  
DATED : December 20, 2016  
INVENTOR(S) : Stephen Denis Kirkby et al.

Page 1 of 1

It is certified that error appears in the above-identified patent and that said Letters Patent is hereby corrected as shown below:

On the Title Page

At Item (30), Foreign Application Priority Data "12386020" should be "12386020.7".

Signed and Sealed this  
Twenty-first Day of March, 2017

Michelle K. Lee  
*Director of the United States Patent and Trademark Office*